Patented Aug. 14, 1945

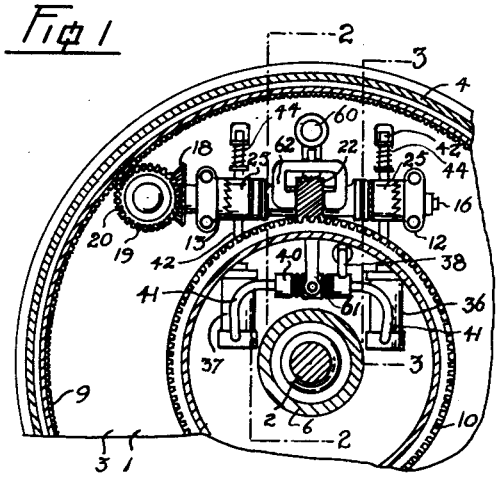

2,382,180

UNITED STATES PATENT OFFICE 2,382,180

VEHICLE BRAKE

Frank Scott, Rounds, British Columbia, Canada

Application October 4, 1944, Serial No. 557,110

4 Claims. (Cl. 188—152)

My invention relates to improvements in vehicle brakes, which are particularly adapted for use in trucks, and other self-propelled vehicles and trailers.

The invention contemplates the utilization of a worm and worm wheel of substantially equal pitch in which one of the elements is caused to bind against the other to provide the braking effort. Devices of this type have been used but have not obtained universal favour on account of many difficulties such as providing for the proper application of the brakes on both front or back wheels when the truck is turning, also in providing that the brakes shall come into action when the wheels are rotating in either direction. It is with these and other objects in view that the present invention is designed.

Referring to the drawing:

Fig. 1 is a sectional view of the invention taken on the line 1—1 of Figure 2.

Fig. 2 is a sectional view of the invention taken on the line 2—2 of Figure 1.

Fig. 3 is a sectional view of the invention taken on the line 3—3 of Figure 1.

Fig. 4 is an enlarged plan view of the spline shaft assembly.

Fig. 5 is a part sectional view of the transfer valve.

In the drawing like characters of reference indicate corresponding parts in each figure.

The numeral 1 indicates the brake housing surrounding a front wheel spindle 2. The housing 1 consists of a disc 3 having a cylindrical wall 4. A hub 6 is mounted upon the spindle 2 and carries a housing cover 7 to which a wheel, not shown, is adapted to be secured by bolts in the usual manner. The cover 7 supports concentrically an internal gear ring 9 and a worm gear 10. Mounted upon the disc 3 are bearings 12, 13 and 14. A shaft 16 having a splined portion 17 intermediate its length is journalled in the bearings 12 and 13. This shaft is fitted adacent the bearing 13 with a mitre gear 18 which meshes with a mitre gear 19. The mitre gear 19 is coupled to a pinion 20 which meshes with the internal gear ring 9, both mitre gear 19 and pinion 20 being rotatably carried by the bearing 14.

Mounted upon the splined portion 17 of the shaft 16 is a worm pinion 22 having an integral sleeve 23 on each end. The worm 22 and its sleeve 23 are capable of slight sliding movement between two opposed thrusts generally indicated by the numeral 25. Each thrust consists of a collar 26 which is non-rotatably connected to its adjacent bearing 12 or 13 and is provided with saw tooth dogs 27 upon its inner face and facing each set of dogs 27 is a rocking sleeve 28 having mating saw tooth dogs 29. The inner end of the rocking sleeve is provided with a suitable anti-friction thrust bearing 30 which is adapted to be abutted by the adjacent sleeve 23 of the worm pinion 22. Each rocking sleeve is provided with one or more gear teeth 32 which are engaged by the teeth 33 of a rack 34.

Mounted upon the disc 3 are hydraulic brake cylinders 36 and 37 which are selectively supplied with operating fluid under pressure through a fluid line 38 connected to a suitable master cylinder, not shown, a transfer valve 40, shown in detail in Figure 5, and pipes 41. Each of the cylinders is provided with a plunger 42 to which is connected a rack 34 and each rack is provided with a spring 44 for returning the rack to its normal position as shown in Figures 1 and 3 when the pressure applied to its plunger is removed.

The transfer valve 40 consists of opposed cups 46 each of which connect by the pipes 41 to the cylinders 36 and 37 and are held in fixed position upon the disc 3. A valve seat 48 is provided between each cup and its pipe 41. Equally spaced between the cups 46 is an apertured disc or spider 50 having trunnions 51 upon its outer periphery and supporting a concentric hub 52 in which is carried a double ended valve stem 54 which is moved to close against one valve seat 48 as it opens from the other of said seats. A bellows 55 connects each cup 46 with the spider 50 to enclose the body of the valve 40. The fluid supply line communicates with one of the cups 46 of the valve through a connection 56.

Fulcrumed upon a pin 60 carried from the disc 3 is a forked lever 61 which extends to and connects with the trunnions 51 of the transfer valve 40. The upper end of the lever 61 is provided with a fork 62 which engages opposite faces of the worm pinion 22 so that the pinion is moved along the splined portion 17 of the shaft 18, incidental to the rotation of the wheel housing cover 7 the lever will be moved in the same direction, but to a greater degree to close off the flow of fluid from the line 38 to one of the cylinders 41.

The operation of the device is as follows:

As the wheel attached to the cover 7 starts to turn in an anti-clockwise direction as viewed from Figure 1, the shaft 18 will turn in an anti-clockwise direction as from Figure 2 and the worm pinion 22 will rotate in a similar direction. The teeth of the worm pinion and worm gear 10 are so cut as to provide an appreciable amount of slack so that when the device is in normal use the worm pinion may move along its splines to a point where it can idle freely without imparting either drag or drive to the worm gear. With the wheel rotating as above described, the pinion will move slightly away from the mitre gear 18 to assume its free idling position and by so doing will swing the lever 61 to the right as shown in Figure 5, leaving the fluid passage open from the master cylinder of the hydraulic brake control system through the left hand seat 48 to the cylinder 37, as this takes place the left sleeve portion 23 of the worm pinion will approximately abut the thrust 25 adjacent the mitre gear 18. When the fluid pressure is developed in the line 38, the rack 34 of the cylinder 37 will be raised, rocking its associated sleeve 28 so that said sleeve will move to the right incidental to the riding of dogs 29 upon the dogs 27, thus forcing the teeth of the worm pinion 22 into dragging engagement with the teeth of the worm gear 10. The drag in the drive between the worm pinion 22 and the worm gear 10 will vary according to the fluid pressure applied to the rack 34 and the braking effect will also be proportionate to the drag. As soon as the pressure is relieved from the line, the rack will be returned to normal position by its spring 44 and the teeth 27 and 29 will return to proper mesh as shown in Figure 1, when the mitre pinion will again resume its free idling position.

If the direction of rotation is reversed, the worm pinion will find its free idling position by moving towards the mitre gear 18, thus changing the position of the lever 61 and opening communication between the line 38 and the cylinder 36, simultaneously closing it against the cylinder 37, so that subsequent operation of the master brake cylinder will apply the brake in exactly the same manner and to the same extent as that above described.

What I claim as my invention is:

1. A wheel brake assembly comprising a brake housing, a spindle and a wheel carrying member rotatable concentrically about the housing comprising a gear ring and a worm gear mounted concentrically within the wheel carrying member, a shaft and gear train mounted within the brake housing operatively connecting the gear ring and the worm gear together, said gear train including a worm pinion to mesh with the worm gear, said worm pinion being slidably mounted upon the shaft, a pair of thrust devices closely spaced from opposite sides of the worm pinion, and means for moving one of said thrusts into contact with the worm pinion to cause binding between said worm pinion and said worm gear.

2. A wheel brake assembly comprising a brake housing, a spindle and a wheel carrying member rotatable concentrically about the housing comprising a gear ring and a worm gear mounted concentrically within the wheel carrying member, a shaft and gear train mounted within the brake housing operatively connecting the gear ring and the worm gear together, said gear train including a worm pinion to mesh with the worm gear, said worm pinion being mounted for slight sliding movement upon the shaft, a thrust device adjacent each side of said pinion, either of which is adapted to be moved towards the worm pinion and means operable in response to rotation of the wheel in either direction to selectively urge one of the thrust devices towards the pinion.

3. A wheel brake assembly comprising a brake housing having a spindle and a wheel carrying member rotatable about the housing, a gear ring and a worm gear mounted concentrically within the wheel carrying member, a shaft and gear train mounted within the brake housing operatively connecting the gear ring and worm gear together, said gear train including a worm pinion having a slight sliding movement upon the shaft, a lever mounted within the brake housing, a connection between said lever and the worm pinion, a pair of thrust devices normally limiting the endwise movement of the worm pinion along the shaft, a hydraulic cylinder having a plunger operatively connected to each of the thrust devices, a valve for selectively directing a flow of fluid under pressure to the cylinders and a valve connected to said lever whereby the movement of the pinion along the shaft due to rotation of the wheel carrying member will cause the valve to be set to admit fluid under pressure to one of the cylinders and close off the other cylinder from said fluid flow.

4. A wheel brake assembly comprising a brake housing having a spindle and a wheel carrying member rotatable about the housing, a gear ring and a worm gear mounted concentrically upon the wheel carrying member, a shaft and gear train including a worm pinion having a slight movement lengthwise of the periphery of the worm gear to produce binding between the worm pinion and worm gear when the wheel is rotating and to brake said wheel, manual means for urging the pinion lengthwise and means responsive to the rotation of the wheel in either direction for causing the manual means to urge the pinion in the proper direction to cause said binding.

FRANK SCOTT.